(12) United States Patent
Martensson

(10) Patent No.: US 7,856,784 B2
(45) Date of Patent: *Dec. 28, 2010

(54) FLOORING PANEL OR WALL PANEL AND USE THEREOF

(75) Inventor: Goram Martensson, Klagstorp (SE)

(73) Assignee: Pergo AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/188,639

(22) Filed: Aug. 8, 2008

(65) Prior Publication Data

US 2009/0038253 A1   Feb. 12, 2009

Related U.S. Application Data

(63) Continuation of application No. 10/158,945, filed on Jun. 3, 2002, now Pat. No. 7,497,058, which is a continuation of application No. 09/637,036, filed on Aug. 10, 2000, now Pat. No. 6,397,547, which is a continuation of application No. 08/894,966, filed as application No. PCT/SE96/00256 on Feb. 29, 1996, now Pat. No. 6,101,778.

(30) Foreign Application Priority Data

Mar. 7, 1995 (SE) .................................. 9500810

(51) Int. Cl.
*E04B 1/38* (2006.01)

(52) U.S. Cl. .................... 52/582.1; 52/586.1; 52/591.1; 52/591.3; 52/591.4; 52/592.1; 52/592.2

(58) Field of Classification Search ................ 52/588.1, 52/586.1, 591.1, 591.3, 591.4, 592.1, 592.2, 52/582.1
See application file for complete search history.

(56) References Cited

U.S. PATENT DOCUMENTS

| 208,036 A | 9/1878 | Robley |
| 213,740 A | 4/1879 | Conner |
| 308,313 A | 11/1884 | Gerike |
| 662,458 A | 11/1900 | Nagel |
| 714,987 A | 12/1902 | Wolfe |

(Continued)

FOREIGN PATENT DOCUMENTS

AU    199732569    12/1999

(Continued)

OTHER PUBLICATIONS

U.S. Appl. No. 90/637,036, filed Oct. 2000, Pervan.

(Continued)

*Primary Examiner*—Jeanette Chapman
(74) *Attorney, Agent, or Firm*—Novak Druce & Quigg LLP

(57) ABSTRACT

Flooring panel or wall panel and a use thereof in a wet room. The panel is provided with a locking means in the form of groove (6) and tongue (7) forming a tongue/groove joint for assembling of the panels. The groove (6) and the tongue (7) are preferably made of water tight material and formed with a snap-together joint.

38 Claims, 1 Drawing Sheet

U.S. PATENT DOCUMENTS

| | | | |
|---|---|---|---|
| 753,791 A | 3/1904 | Fulghum |
| 769,355 A | 9/1904 | Platow |
| 832,003 A | 9/1906 | Torrence |
| 877,639 A | 1/1908 | Galbraith |
| 898,381 A | 9/1908 | Mattison |
| 1,097,986 A | 5/1914 | Moritz |
| 1,124,226 A | 1/1915 | Houston |
| 1,137,197 A | 4/1915 | Ellis |
| 1,140,958 A | 5/1915 | Cowan |
| 1,319,286 A | 10/1919 | Johnson et al. |
| 1,407,679 A | 2/1922 | Ruchrauff |
| 1,454,250 A | 5/1923 | Parsons |
| 1,468,288 A | 9/1923 | Fen |
| 1,510,924 A | 10/1924 | Daniels et al. |
| 1,540,128 A | 6/1925 | Houston |
| 1,576,821 A | 3/1926 | Daniels |
| 1,602,256 A | 10/1926 | Sellin |
| 1,602,267 A | 10/1926 | Karwisde |
| 1,615,096 A | 1/1927 | Myers |
| 1,622,103 A | 3/1927 | Fulton |
| 1,622,104 A | 3/1927 | Fulton |
| 1,637,634 A | 8/1927 | Carter |
| 1,644,710 A | 10/1927 | Crooks |
| 1,660,480 A | 2/1928 | Daniels |
| 1,706,924 A | 3/1929 | Kane |
| 1,714,738 A | 5/1929 | Smith |
| 1,718,702 A | 6/1929 | Pfiester |
| 1,734,826 A | 11/1929 | Pick |
| 1,764,331 A | 6/1930 | Moratz |
| 1,776,188 A | 9/1930 | Langbaum |
| 1,778,069 A | 10/1930 | Fetz |
| 1,787,027 A | 12/1930 | Wasleff |
| 1,823,039 A | 9/1931 | Gruner |
| 1,854,396 A | 4/1932 | Davis |
| 1,859,667 A | 5/1932 | Gruner |
| 1,898,364 A | 2/1933 | Gynn |
| 1,906,411 A | 5/1933 | Potvin |
| 1,913,342 A | 6/1933 | Schaffert |
| 1,929,871 A | 10/1933 | Jones |
| 1,940,377 A | 12/1933 | Storm |
| 1,953,306 A | 4/1934 | Moratz |
| 1,986,739 A | 1/1935 | Mitte |
| 1,988,201 A | 1/1935 | Hall |
| 1,991,701 A | 2/1935 | Roman |
| 2,004,193 A | 6/1935 | Cherry |
| 2,027,292 A | 1/1936 | Rockwell |
| 2,044,216 A | 6/1936 | Klages |
| 2,045,067 A | 6/1936 | Bruce |
| 2,049,571 A | 8/1936 | Schuck |
| 2,141,708 A | 12/1938 | Elmendorf |
| 2,142,305 A | 1/1939 | Davis |
| 2,199,938 A | 5/1940 | Kloote |
| 2,222,137 A | 11/1940 | Bruce |
| 2,245,497 A | 6/1941 | Potchen |
| 2,276,071 A | 3/1942 | Scull |
| 2,282,559 A | 5/1942 | Byers |
| 2,324,628 A | 7/1943 | Kahr |
| 2,398,632 A | 4/1946 | Frost et al. |
| 2,430,200 A | 11/1947 | Wilson |
| 2,491,498 A | 12/1949 | Kahr |
| 2,644,552 A | 7/1953 | MacDonald |
| 2,729,584 A | 1/1956 | Foster |
| 2,740,167 A | 4/1956 | Rowley |
| 2,780,253 A | 2/1957 | Joa |
| 2,808,624 A | 10/1957 | Sullivan |
| 2,894,292 A | 7/1959 | Gramelspacher |
| 2,952,341 A | 9/1960 | Weiler |
| 3,045,294 A | 7/1962 | Livezey, Jr. |
| 3,090,082 A | 5/1963 | Bauman |
| 3,100,556 A | 8/1963 | Ridder |
| 3,125,138 A | 3/1964 | Bolenbach |
| 3,128,851 A | 4/1964 | Deridder et al. |
| 3,182,769 A | 5/1965 | de Ridder |
| 3,203,149 A | 8/1965 | Soddy |
| 3,204,380 A * | 9/1965 | Wilson ............... 52/309.15 |
| 3,253,377 A | 5/1966 | Schakel |
| 3,267,630 A | 8/1966 | Omholt |
| 3,282,010 A | 11/1966 | King, Jr. |
| 3,310,919 A * | 3/1967 | Bue .................. 52/127.11 |
| 3,347,048 A | 10/1967 | Brown et al. |
| 3,373,071 A | 3/1968 | Fuerst |
| 3,387,422 A | 6/1968 | Wanzer |
| 3,397,496 A * | 8/1968 | Sohns ................. 52/286 |
| 3,460,304 A | 8/1969 | Braeuninger et al. |
| 3,479,784 A | 11/1969 | Massagli |
| 3,481,810 A | 12/1969 | Waite |
| 3,526,420 A | 9/1970 | Brancaleone |
| 3,535,844 A | 10/1970 | Glaros |
| 3,538,665 A | 11/1970 | Gohner |
| 3,538,819 A | 11/1970 | Gould et al. |
| 3,553,919 A | 1/1971 | Omholt |
| 3,555,762 A | 1/1971 | Costanzo, Jr. |
| 3,657,852 A | 4/1972 | Worthington et al. |
| 3,694,983 A | 10/1972 | Couquet |
| 3,714,747 A | 2/1973 | Curran |
| 3,720,027 A | 3/1973 | Christensen |
| 3,731,445 A | 5/1973 | Hoffmann et al. |
| 3,759,007 A | 9/1973 | Thiele |
| 3,768,846 A | 10/1973 | Hensley et al. |
| 3,798,111 A | 3/1974 | Lana et al. |
| 3,807,113 A | 4/1974 | Turner |
| 3,859,000 A | 1/1975 | Webster |
| 3,884,328 A | 5/1975 | Williams |
| 3,902,293 A | 9/1975 | Witt et al. |
| 3,908,053 A | 9/1975 | Hettich |
| 3,921,312 A | 11/1975 | Fuller |
| 3,936,551 A | 2/1976 | Elmendorf et al. |
| 3,988,187 A | 10/1976 | Witte et al. |
| 4,074,496 A | 2/1978 | Fischer |
| 4,090,338 A | 5/1978 | Bourgade |
| 4,099,358 A | 7/1978 | Compaan |
| 4,169,688 A | 10/1979 | Toshio |
| 4,186,539 A | 2/1980 | Harmon et al. |
| 4,242,390 A | 12/1980 | Nemeth |
| 4,299,070 A | 11/1981 | Oltmanns et al. |
| 4,316,351 A | 2/1982 | Ting |
| 4,390,580 A | 6/1983 | Donovan et al. |
| 4,426,820 A | 1/1984 | Terbrack et al. |
| 4,449,346 A | 5/1984 | Tremblay |
| 4,471,012 A | 9/1984 | Maxwell |
| 4,501,102 A | 2/1985 | Knowles |
| 4,561,233 A | 12/1985 | Harter et al. |
| 4,612,745 A | 9/1986 | Hovde |
| 4,641,469 A | 2/1987 | Wood |
| 4,643,237 A | 2/1987 | Rosa |
| 4,653,242 A | 3/1987 | Ezard |
| 4,703,597 A | 11/1987 | Eggemar |
| 4,715,162 A | 12/1987 | Brightwell |
| 4,738,071 A | 4/1988 | Ezard |
| 4,757,658 A | 7/1988 | Kaempen |
| 4,769,963 A | 9/1988 | Meyerson |
| 4,796,402 A | 1/1989 | Pajala |
| 4,819,932 A | 4/1989 | Trotter, Jr. |
| 4,831,806 A | 5/1989 | Niese et al. |
| 4,845,907 A | 7/1989 | Meek |
| 4,905,442 A | 3/1990 | Daniels |
| 4,940,503 A | 7/1990 | Lindgren et al. |
| 4,952,775 A * | 8/1990 | Yokoyama et al. ....... 219/213 |
| 5,029,425 A | 7/1991 | Bogataj |
| 5,050,362 A | 9/1991 | Tal et al. |
| 5,070,662 A * | 12/1991 | Niese .................. 52/127.7 |
| 5,086,599 A | 2/1992 | Meyerson |
| 5,113,632 A | 5/1992 | Hanson |
| 5,117,603 A | 6/1992 | Weintraub |

| | | | |
|---|---|---|---|
| 5,148,850 A | 9/1992 | Urbanick |
| 5,165,816 A | 11/1992 | Parasin |
| 5,179,812 A | 1/1993 | Hill |
| 5,216,861 A | 6/1993 | Meyerson |
| 5,253,464 A | 10/1993 | Nilsen |
| 5,271,564 A | 12/1993 | Smith |
| 5,274,979 A | 1/1994 | Tsai |
| 5,295,341 A | 3/1994 | Kajiwara |
| 5,325,649 A | 7/1994 | Kajiwara |
| 5,344,700 A | 9/1994 | McGath et al. |
| 5,348,778 A | 9/1994 | Knipp et al. |
| 5,349,796 A | 9/1994 | Meyerson |
| 5,390,457 A | 2/1995 | Sjolander |
| 5,433,806 A | 7/1995 | Pasquali et al. |
| 5,474,831 A | 12/1995 | Nystrom |
| 5,497,589 A | 3/1996 | Porter |
| 5,502,939 A | 4/1996 | Zadok et al. |
| 5,540,025 A | 7/1996 | Takehara et al. |
| 5,567,497 A | 10/1996 | Zegler et al. |
| 5,570,554 A | 11/1996 | Searer |
| 5,597,024 A | 1/1997 | Bolyard et al. |
| 5,618,602 A | 4/1997 | Nelson |
| 5,618,612 A | 4/1997 | Gstrein |
| 5,630,304 A | 5/1997 | Austin |
| 5,671,575 A | 9/1997 | Wu |
| 5,706,621 A | 1/1998 | Pervan |
| 5,719,239 A | 2/1998 | Mirous et al. |
| 5,736,227 A | 4/1998 | Sweet et al. |
| 5,797,237 A | 8/1998 | Finkell, Jr. |
| 5,823,240 A | 10/1998 | Bolyard et al. |
| 5,827,592 A | 10/1998 | Van Gulik et al. |
| 5,860,267 A | 1/1999 | Pervan |
| 5,907,934 A | 6/1999 | Austin |
| 5,935,668 A | 8/1999 | Smith |
| 5,941,047 A | 8/1999 | Johansson |
| 5,943,239 A | 8/1999 | Shamblin et al. |
| 5,968,625 A | 10/1999 | Hudson |
| 5,987,839 A | 11/1999 | Hamar et al. |
| 6,006,486 A | 12/1999 | Moriau et al. |
| 6,021,615 A | 2/2000 | Brown |
| 6,023,907 A | 2/2000 | Pervan |
| 6,029,416 A | 2/2000 | Andersson |
| 6,094,882 A | 8/2000 | Pervan |
| 6,101,778 A * | 8/2000 | Maartensson ............... 52/582.1 |
| 6,119,423 A | 9/2000 | Costantino |
| 6,134,854 A | 10/2000 | Stanchfield |
| 6,148,884 A | 11/2000 | Bolyard et al. |
| 6,182,410 B1 | 2/2001 | Pervan |
| 6,182,413 B1 | 2/2001 | Magnusson |
| 6,205,639 B1 | 3/2001 | Pervan |
| 6,209,278 B1 | 4/2001 | Tychsen |
| 6,216,403 B1 | 4/2001 | Belbeoc'h |
| 6,216,409 B1 | 4/2001 | Roy et al. |
| 6,314,701 B1 | 11/2001 | Meyerson |
| 6,324,803 B1 | 12/2001 | Pervan |
| 6,324,809 B1 | 12/2001 | Nelson |
| 6,332,733 B1 | 12/2001 | Hamberger et al. |
| 6,345,481 B1 * | 2/2002 | Nelson ..................... 52/592.2 |
| 6,365,258 B1 | 4/2002 | Alm |
| 6,385,936 B1 | 5/2002 | Schneider |
| 6,397,547 B1 | 6/2002 | Martensson |
| 6,418,683 B1 | 7/2002 | Martensson et al. |
| 6,421,970 B1 | 7/2002 | Martensson et al. |
| 6,438,919 B1 | 8/2002 | Knauseder |
| 6,446,405 B1 | 9/2002 | Pervan |
| 6,510,665 B2 | 1/2003 | Pervan |
| 6,516,579 B1 | 2/2003 | Pervan |
| 6,532,709 B2 | 3/2003 | Pervan |
| 6,588,166 B2 | 7/2003 | Martensson et al. |
| 2001/0029720 A1 | 10/2001 | Pervan |
| 2002/0007608 A1 | 1/2002 | Pervan |
| 2002/0046528 A1 | 4/2002 | Pervan et al. |
| 2002/0100242 A1 | 8/2002 | Olofsson |
| 2002/0112433 A1 | 8/2002 | Pervan |
| 2002/0178674 A1 | 12/2002 | Pervan |
| 2002/0178682 A1 | 12/2002 | Pervan |
| 2003/0009972 A1 | 1/2003 | Pervan et al. |
| 2003/0024199 A1 | 2/2003 | Pervan et al. |
| 2003/0033784 A1 | 2/2003 | Pervan |
| 2003/0084636 A1 | 5/2003 | Pervan |

FOREIGN PATENT DOCUMENTS

| | | |
|---|---|---|
| AU | 200020703 | 6/2000 |
| BE | 417526 | 12/1936 |
| BE | 557844 | 3/1960 |
| BE | 1010339 | 6/1996 |
| BE | 1010487 | 10/1998 |
| CA | 991373 | 6/1976 |
| CA | 1169106 | 6/1984 |
| CA | 2226286 | 12/1997 |
| CA | 2252791 | 5/1999 |
| CA | 2289309 | 11/1999 |
| CH | 200949 | 1/1939 |
| CH | 211677 | 1/1941 |
| DE | 1212275 | 3/1966 |
| DE | 1534802 | 4/1970 |
| DE | 7102476 | 6/1971 |
| DE | 1534278 | 11/1971 |
| DE | 2159042 | 6/1973 |
| DE | 2238660 | 2/1974 |
| DE | 7402354 | 5/1974 |
| DE | 2502992 | 7/1976 |
| DE | 2616077 | 10/1977 |
| DE | 2917025 | 11/1980 |
| DE | 31 04 519 | 2/1981 |
| DE | 3041781 | 5/1982 |
| DE | 3041781 | 6/1982 |
| DE | 3214207 | 11/1982 |
| DE | 4134452 | 4/1983 |
| DE | 3246376 | 6/1984 |
| DE | 3343601 | 6/1985 |
| DE | 3343601 C2 | 6/1985 |
| DE | 8604004 | 8/1986 |
| DE | 3512204 | 10/1986 |
| DE | 3246376 | 5/1987 |
| DE | 3544845 | 6/1987 |
| DE | 3631390 | 12/1987 |
| DE | 400254-70 | 8/1991 |
| DE | 4215273 | 11/1993 |
| DE | 4242530 A1 | 6/1994 |
| DE | 9317191 | 3/1995 |
| DE | 29710175 U1 | 8/1997 |
| DE | 19651149 | 6/1998 |
| DE | 19709641 | 9/1998 |
| DE | 20001225 | 7/2000 |
| DE | 19925248 | 12/2000 |
| DE | 20018284 | 1/2001 |
| DE | 20017461 | 2/2001 |
| DE | 20027461 | 3/2001 |
| EP | 0248127 | 12/1987 |
| EP | 0 220 389 B1 | 5/1992 |
| EP | 0623724 | 11/1994 |
| EP | 0652340 | 5/1995 |
| EP | 0698162 | 2/1996 |
| EP | 0843763 | 5/1998 |
| EP | 0849416 | 6/1998 |
| EP | 0855482 | 7/1998 |
| EP | 0877130 | 11/1998 |
| EP | 0903451 | 3/1999 |
| EP | 0958441 | 11/1999 |
| EP | 0969163 | 1/2000 |
| EP | 0969164 | 1/2000 |
| EP | 0974713 | 1/2000 |
| EP | 0969163 | 2/2000 |
| FI | 843060 | 8/1984 |

| | | |
|---|---|---|
| FR | 557844 | 8/1923 |
| FR | 1215852 | 4/1960 |
| FR | 1293043 | 5/1962 |
| FR | 2568295 | 1/1986 |
| FR | 2630149 | 10/1989 |
| FR | 2637932 | 4/1990 |
| FR | 2675174 | 10/1992 |
| FR | 2691491 | 11/1993 |
| FR | 2891491 | 11/1993 |
| FR | 2697275 | 4/1994 |
| FR | 2712329 | 5/1995 |
| FR | 2781513 | 1/2000 |
| FR | 2785633 | 5/2000 |
| GB | 424057 | 2/1935 |
| GB | 599793 | 3/1946 |
| GB | 585205 | 1/1947 |
| GB | 636423 | 4/1950 |
| GB | 812671 | 4/1959 |
| GB | 812871 | 4/1959 |
| GB | 1237744 | 6/1971 |
| GB | 1348272 | 3/1974 |
| GB | 1430423 | 3/1976 |
| GB | 2117813 | 10/1983 |
| GB | 2126106 | 3/1984 |
| GB | 2142670 A | 1/1985 |
| GB | 2168732 A | 6/1986 |
| GB | 2243381 | 10/1991 |
| GB | 2256023 | 11/1992 |
| IT | 812671 | 4/1959 |
| JP | 5465528 | 5/1979 |
| JP | 57119056 | 7/1982 |
| JP | 3169967 | 7/1991 |
| JP | 4106264 | 4/1992 |
| JP | 4191001 | 7/1992 |
| JP | 5148984 | 6/1993 |
| JP | 6-146553 | 5/1994 |
| JP | 6146553 | 5/1994 |
| JP | 656310 | 8/1994 |
| JP | 6320510 | 11/1994 |
| JP | 752103 | 2/1995 |
| JP | 407052103 A | 2/1995 |
| JP | 7076923 | 3/1995 |
| JP | 7180333 | 7/1995 |
| JP | 7300979 | 11/1995 |
| JP | 7310426 | 11/1995 |
| NL | 7601773 | 2/1975 |
| NO | 157871 | 7/1984 |
| NO | 305614 | 5/1995 |
| PL | 26931 | 6/1989 |
| SE | 372051 | 12/1974 |
| SE | 7114900-9 | 12/1974 |
| SE | 450141 | 6/1987 |
| SE | 8206934-5 | 6/1987 |
| SE | 457737 | 1/1989 |
| SE | 501014 | 10/1994 |
| SE | 9301595-6 | 2/1995 |
| SE | 502994 | 3/1996 |
| SE | 509059 | 11/1998 |
| SE | 509060 | 11/1998 |
| SE | 512290 | 2/2000 |
| SE | 512313 | 2/2000 |
| SU | 363795 | 11/1973 |
| WO | WO 80/02155 | 10/1980 |
| WO | WO 84/02155 | 6/1984 |
| WO | WO8402155 | 6/1984 |
| WO | WO8703839 | 7/1987 |
| WO | WO9217657 | 10/1992 |
| WO | WO 93/13280 | 7/1993 |
| WO | WO9313280 | 7/1993 |
| WO | WO9401628 | 1/1994 |
| WO | WO9426999 | 11/1994 |
| WO | WO 96/23942 | 8/1996 |
| WO | WO9623942 | 8/1996 |
| WO | WO9627719 | 9/1996 |
| WO | WO9627721 | 9/1996 |
| WO | WO9630177 | 10/1996 |
| WO | WO9747834 | 12/1997 |
| WO | WO9824994 | 6/1998 |
| WO | WO9824995 | 6/1998 |
| WO | WO 98/58142 | 12/1998 |
| WO | WO9858142 | 12/1998 |
| WO | WO9940273 | 8/1999 |
| WO | WO9966151 | 12/1999 |
| WO | WO9966152 | 12/1999 |
| WO | WO0006854 | 2/2000 |
| WO | WO0056802 | 9/2000 |
| WO | WO0063510 | 10/2000 |
| WO | WO0066856 | 11/2000 |

OTHER PUBLICATIONS

U.S. Appl. No. 08/894966, filed Aug. 1997, Pervan.
Patent Mit Inter-nationalem, Die Revolution ((von Grund auf)) Fibo-Trespo, Disstributed at the Domotex fair in Hannover, Germany in Jan. 1996.
Traindustrins Handbok "Snickeriarbete", Knut Larsson, Tekno's Handbocker Publikation 12-11 (1952).
Trabearbetning Anders Gronlund, TraleknikCentrum.
Bojlesystemet til Junckers boliggulve, Junckers Trae for Livet.
The Clip System for Junckers Sports Floors, Junckers Solid Hardood Flooring, Annex 7, p. ½.
The Clip System for Junckers Sports Floors, Junckers Solid Hardood Flooring, Annex 8, p. ¼.
Focus, Information Till Alla Medabetare, Jan. 2001, Kahrs pa Domotex I Hannover, Tyskland, Jan. 13-16, 2001.
Opplaering OG Autorisasjon, Fibo-Trespo, ALLOC, Laminatgulvet som Legges Uter Lin.
CLIC, Art-Nr, 110 11 640.
Laminat-Boden, Clever-Clickq.
Pergo, Clic Flooring, Laminatgolv.
Letter to the USPTO dated May 14, 2002, regarding U.S. Appl. No. 90/005,744.
Webster's, Dictionary, p. 862, definition of "scarf".
Knight's American Mechanical Dictionary, vol. III. 1876, definition of "scarf".
Special Verdict, Civil Case No. 02.0736.
Fiboloc Literature, Mar. 1999.
Fibolic Brochure, undated.
Appeals from the United States District Court for the Eastern District of Wisconsin; Consolidated case No. 02-CV-0736 and 03-CV-616; Judge J.P. Stadtmueller, 2009-1107,-1122.
Appeals from the United States District Court for the Eastern District of Wisconsin; Consolidated case No. 02-CV-0736 and 03-CV-616; 2009-1107,-1122; Revised Feb. 25, 2010.
United States District Court North Carolina; Pergo (Europe) AB v Unilin Beheer BV, Civil. Action No. 5:08-CV-91; Joint Stipulation of Dismissal.
United States District Court of North Carolina; Pergo (Europe) AB v Unilin Beheer BV. Civil Action No. 5:08-CV-91-H3; Plantiffs Original Complaint for Patent Infringement.
United States District Court of North Carolina; Pergo (Europe) Ab v Unilin Beheer BV. Civil Action No. 5:08-CV-91-H3: Answer and Counterclaim of Defendant.
United States Court of Appeals fo the Federal Circuit; Case No. 02-CV-0736 and 03-CV-616; Mandate issued on Apr. 12, 2010; Judgment; 2 pages.
Fundamentals of Building Construction Materials and Methods; Copyright 1985; pp. 11.
Automated Program fo Designing Snap-fits; Aug. 1987; pp. 3.
Plastic Product Design; Van Nostrand Reinhold Company; pp. 256-258.
Traditional Details; For Building Resoration, Renovation, and Rehabilitation: From the 1932-1951 Editions of Architectvral Graphic Standards; John Wiley & Sons, Inc.
Whittington's Dictionary of Plastics; Edited by James F. Carley, Ph.D., PE; pp, 443, 461; 1993.

Encyclopedia of Wood Joints; A Fine Woodworking Book; pp. 1-151; 1992.
High-Production Roll Forming; Society of Manufacturing Engineers Marketing Services Department; pp. 189-192; George T. Halmos; 1983.
Knight's American Mechanical Dictionary; 3 Edward H. Knight; vol. III; p. 2051; 1876.
Plastic Part Technology; 1991; pp. 161-162.
New Software Simplifies Snap-Fit Design; Design News; p. 148.
Hot Rolling Of Steel; Library of Congress Cataloging in Publication Data; Roberts, Willam L; p. 189.
Technoscope; Modern Plastics, Aug. 1991; pp. 29-30.
Die mobile; Terbrack; 1968.
Tree Pjecer; pp. 1-35.
Elements of Rolling Practice; The United Steel Companies Limited Sheffield, England, 1963;pp. 116-117.

Wood Handbook; Forest Products Laboratory, 1999; "Glossary pp. G-1 to 0-14", "Chapter 10, pp. 10-1 to 10-31".
United States District Court Eastern District of Wisconsin; Order; Dated Oct. 10, 2008.
United States District Court Eastern District of Wisconsin; Judgment; Dated Oct. 10, 2008.
United States District Court Eastern District of Wisconsin; Order; Dated May 1, 2008.
United States District Court Eastern District of Wisconsin; Order; Dated Dec. 31, 2008.
United States Court of Appeals for Federal Circuit; 2009-1107,-1122; Decided: Feb. 18, 2010.
United States District Court Eastern of Wisconsin; Pervan Testimony; Trial Day 5 (Official Transcript); pp. 1101-1292.

* cited by examiner

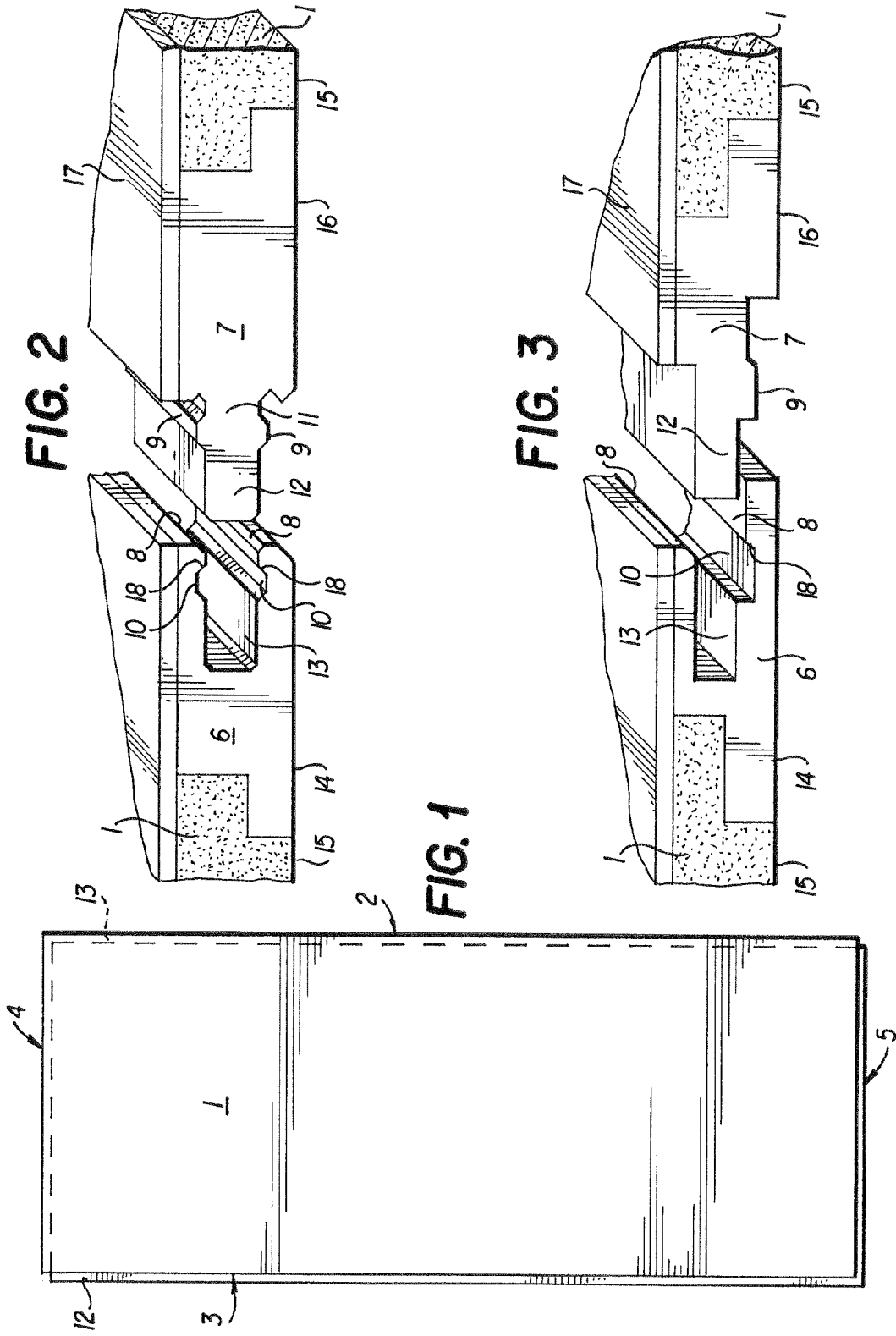

FLOORING PANEL OR WALL PANEL AND USE THEREOF

CROSS-REFERENCE TO RELATED APPLICATIONS

This application is a continuation of U.S. patent application Ser. No. 10/158,945, filed Jun. 3, 2002 now U.S. Pat. No. 7,497,058, which is a continuation of U.S. patent application Ser. No. 09/637,036, filed Aug. 10, 2000, now U.S. Pat. No. 6,397,547, which, in turn, is a continuation of U.S. patent application Ser. No. 08/894,966, filed Sep. 28, 1997, now U.S. Pat. No. 6,101,778, which is a 371 of PCT/SE96/00256, 2/29/1996 all of which are incorporated herein in their entirety by reference.

BACKGROUND OF THE INVENTION

1. Field of the Invention

The present invention relates to a flooring panel or wall panel and the use thereof in a wet room.

2. Description of the Prior Art

During the last few years laminated floors have achieved and increased popularity and on many markets they are beginning to replace parquet floors and wall-to-wall carpets. At the production of laminated floors a decorative thermosetting laminate is first produced. This laminate usually consists of a base layer of paper sheets impregnated with phenol-formaldehyde resin and a decorative surface layer consisting of a decor paper sheet impregnated with melamine-formaldehyde resin. The laminate is produced by pressing the different layers at a high pressure and an increased temperature.

The laminate obtained is then glued to a carrier of particle board for instance or used as such without any carrier and it is then called compact laminate The laminated panel thus produced is then sawn up to a number of floor boards which are provided with groove and tongue at the long sides and the short sides. Often the floor boards produced have a thickness of about 7 mm, a length of 120 cm and a width of about 20 cm. Thereby they can usually be put on top of an existing flooring material at a renovation. According to another alternative, instead one or more of the above decorative sheets can be laminated directly towards a base sheet of particle board for instance

SUMMARY OF THE INVENTION

At the assemblage of such a flooring glue is normally applied in the groove when the floor boards are assembled. Therefore, it will be difficult to change a damaged board or to remove a whole flooring and for instance install it in another room To avoid the above problem efforts have been made to achieve floor boards which can be assembled without glue. One such construction is disclosed in the U.S. Pat. No. 5,295,341

There the boards are provided with groove and tongue in the usual way, but here a snap-together system is included in the groove-tongue joint These floor boards can be assembled without glue However, they have the disadvantage that the joints between the boards will be flexible and not rigid this means that if the surface below the floor boards is not completely even which is usually the case, a gap will be formed between the boards in these gaps dirt and water can penetrate According to the present invention also the last mentioned problem has been solved and a flooring panel or wall panel, preferably of thermosetting laminate having two pairs of parallel side edges has been brought about. Two of these side edges are provided with a locking means in the form of a groove and the other two with a tongue fitting in the groove whereby a tongue/groove joint for assembling of the panels is formed. The groove and the tongue are made of a water tight material and formed with a snap-together joint including one or more snapping webs or the like with corresponding cooperating snapping grooves. The groove in front of the snap-together joint has an entrance opening and continues inside the snap-together joint in a stabilizing groove. The tongue is formed with a rear neck intended to fit in the entrance opening and a forwardly protruding stabilizing part situated in front of the snap-together joint and intended for a tight fit in the stabilizing groove, whereby connecting panels when assembled by the snap-together joints and the stabilizing parts in the stabilizing grooves are fixed to each other and prevented from unintentional separation while at the same time a rigid floor covering or wall covering respectively with water tight joints and without unintentional gaps between the panels is obtained.

BRIEF DESCRIPTION OF THE DRAWINGS

FIG. 1 schematically shows a panel according to the invention seen from above;

FIG. 2 shows a cross section through two adjacent edges of two panels according to the invention wherein the two such panels are to be assembled; and FIG. 3 shows a cross section through two adjacent edges of a second embodiment of a panel where two such panels are to be assembled.

DESCRIPTION OF THE PREFERRED EMBODIMENTS

It is preferred that the groove and the tongue are made of thermoplastic, a thermosetting laminate, aluminum or a chipboard or particle board impregnated with a thermoplastic. Of course, also other water tight materials can be used.

According to one preferred embodiment two adjacent side edges of the panel are provided with a groove and the other two side edges with a tongue. At this embodiment the panel is usually rectangular, but it can also be square At square panels it is also possible to provide a pair of parallel sides with a groove and the other pair with a tongue However, the choice of pattern on the surface layer of the panel is limited at this shape.

At one embodiment, the groove as well as the tongue are formed as a ledge fixed to the side edges of the panel Suitably the ledge-formed groove and tongue respectively are then fixed in a recess along the side edges with glue for instance The snapping webs can be formed on the upper and/or lower side of the tongue while fitting snapping grooves are formed in the groove In one preferred embodiment one snapping web is formed on the upper side of the tongue and one on the lower side thereof while the groove has two fitting snapping grooves one at the top and one at the bottom if necessary one pair of snapping webs can be formed on the upper side of the tongue and one pair on the lower side thereof. Of course you then need two snapping grooves at the top and two snapping grooves at the bottom of the groove to fit with the snapping webs.

This construction will give an extremely strong joint.

Of course the snapping webs can instead be arranged in the groove and the snapping grooves on the tongue.

In one preferred embodiment the width of the stabilizing part is 2-10 mm, preferably 4-10 mm. Generally a wider stabilizing part with fitting stabilizing groove gives a better rigidity of the assembled panels.

The stabilizing part will also assist in a correct assemblage of the panels. Thus, when the stabilizing part moves into the stabilizing groove you get a correct level of the panels and the panels can easily be pushed into the correct position where you do not have any gap between the panels Of course without any substantial gap between the panels water and dirt are prevented from entering the assembled flooring or wall covering.

As a safe guard against water penetration a seal might be arranged in the inner part of the stabilizing groove for instance.

Preferably the grooves and the tongues run the full length of the side edges of the panels.

The panels can be designed in such a manner that the under side of the groove and the tongue are situated in the same level as the under side of the panel The panels can be used for covering floors and walls in ordinary dry rooms However, due to the rigid and water tight joints the panels can be used also for wet rooms for such applications the whole panel is preferably made of thermosetting laminate of so-called compact laminate type. Such a laminate does not absorb water.

Another alternative is a non water absorbing base with a water tight surface the surface may for instance consist of paint, a thermoplastic foil such as polyethylene, polypropylene or polyvinyl chloride, a paper sheet impregnated with thermosetting resin or of a thermosetting laminate One suitable non water absorbing base is a board produced by pressing wood particles or wood chips impregnated with a thermoplastic The invention will be further explained in connection with the enclosed figures of which FIG. 1 schematically shows a panel 1 according to the invention seen from above The panel is drawn with a rectangular shape but it can as well be square FIGS. 2 and 3 show a cross section through two adjacent edges of two embodiments of a panel where two such panels are to be assembled. The construction according to FIG. 2 is preferred.

The panel 1 consists of a base of wood particles impregnated with a thermoplastic with a decorative thermosetting laminate as a surface layer 17 glued on top.

The panel 1 has two pairs of parallel side edges 2, 3 and 4, 5 respectively (FIG. 1). Two of these side edges are provided with locking means in the form of a groove 6 and the other two with a tongue 7 fitting in the groove 6, whereby a tongue/groove joint for assembling of the panels is formed.

The groove 6 and the tongue 7 are made of a water tight material and formed with a snap-together joint. In the embodiment shown in FIG. 2 the snap-together joint consists of two snapping webs 9, one oil the upper side of the tongue 7 and one on the lower side of tongue, these webs 9 cooperating with two fitting snapping grooves 10

In front of the snap-together joint, which means the snapping webs 9 and the snapping groove 10, the groove 6 has an entrance opening 8. Inside the snap-together joint the groove 6 continues in a stabilizing groove 13.

The tongue 7 is formed with a rear neck 11 intended to fit in the entrance opening 8 of the groove 6. In front of the snap-together joint the tongue 7 has a forwardly protruding stabilizing part 12 intended for a tight fit in the stabilizing groove 13

The parts 9 and 10 included in the snap-together joint are also adapted to each other to give a tight fit and strong joint to increase this effect further the snapping grooves 10 are provided with undercut edges 18 which cooperate with the backside of the snapping webs 9 with the same undercut The groove 6 and the tongue 7 are made of thermosetting laminate and formed as a ledge fixed by glue in a recess along the side edges of the panel. The under side 14 of the groove 6 is situated in the same level as the under side 15 of the panel and the under side 16 of the tongue 7 is situated in the same level as the under side 15 of the panel 1.

When connecting panels have been assembled by the snap-together joints and the stabilizing parts 12 inserted in the stabilizing grooves 13, the panels are fixed to each other and prevented from unintentional separation A rigid floor covering or wall covering with water tight points and without unintentional gaps between the panels is obtained The usual rotation of the snapping webs 9 in tile snapping grooves 10 is prevented by the stabilizing parts 12 in the stabilizing grooves 13 Accordingly these parts are essential for the possibility to get a rigid joint between the panels.

The embodiment shown in FIG. 3 is very similar to that according to FIG. 2 the difference is that only the under side of the tongue 7 is provided with a snapping web 9. The upper side is lacking a snapping web. Accordingly there is only one snapping groove 10 at the bottom of the groove 6.

The invention is not limited to the embodiments shown since these can be modified in different ways within the scope of the invention.

I claim:

1. A building panel comprising:
    an upper surface terminating at a distal end, the upper surface comprising at least one material selected from the group consisting of a thermoplastic foil, a paper impregnated with a thermosetting resin, and a thermosetting laminate;
    a plurality of sides defining a perimeter thereof,
    at least one side of each panel being provided with a groove;
    at least a second side of each panel being provided with a tongue;
    at least one of the tongue and groove having at least one protrusion, thereby forming a first locking element;
    at least one complementary depression forming a second locking element, configured to cooperate with said at least one protrusion;
    wherein the first and second locking elements lock the panel to an adjacent panel when the panel and the adjacent panel are joined together.

2. A building panel comprising:
    an upper surface terminating at a distal end, the upper surface comprising at least one material selected from the group consisting of a thermoplastic foil, a paper impregnated with a thermosetting resin, and a thermosetting laminate;
    a plurality of sides defining a perimeter thereof,
    at least one side of each panel being provided with a groove;
    at least a second side of each panel being provided with a tongue;
    at least one of the tongue and groove having at least one protrusion, thereby forming a first locking element;
    at least one complementary depression forming a second locking element, configured to cooperate with said at least one protrusion;
    wherein the first and second locking elements lock the panel to an adjacent panel when the panel and the adjacent panel are joined together, wherein the second locking element comprises a sloping backside and the first locking element comprises undercut edges, such that when joined, the undercut edges and the backside cooperate with each other.

3. The building panel of claim 2, wherein the tongue comprises a first section extending inwardly of the distal end of the upper surface towards a core which is beneath said upper surface.

4. The building panel of claim 3, wherein the tongue further comprises a second section extending away from the core and beyond the distal end of the upper surface.

5. The building panel of claim 2, wherein the tongue comprises a first part comprising a rear portion which extends from the underside of the panel to the locking element and a forward portion of the tongue which extends from the locking element to the end of the tongue.

6. The building panel of claim 2, wherein the panel comprises a plastic with a wood based filler.

7. The building panel of claim 6, wherein the wood based filler is wood chips.

8. The building panel of claim 6, wherein the wood based filler comprises wood particles.

9. The building panel of claim 6, wherein the wood based filler is wood particles.

10. The building panel of claim 6, wherein the tongue comprises the same material as the panel.

11. The building panel of claim 2, wherein the tongue comprises a plastic with at least one wood based filler selected from the group consisting of wood based chips and wood based particles.

12. The building panel of claim 1, wherein the protrusion is on a lower surface of the tongue.

13. The building panel of claim 12, wherein the depression is on a lower portion of the groove.

14. The building panel of claim 1, wherein there are at least two protrusions on the tongue.

15. A floor formed from at least two joined panels according to claim 1, wherein there is no gap between the distal ends of the upper surfaces of the joined panels.

16. A system for forming a wall, floor or cladding by assembling a plurality of panels into an interlocked unit, said system comprising:
a plurality of panels, each of said panels having sides defining a perimeter;
each of said sides being provided with at least one of a tongue or groove;
said panel having an upper surface formed of a paper impregnated with a thermosetting resin or a thermosetting laminate;
at least one of the tongue and groove being provided with a protrusion;
a complimentary depression cooperating with the protrusion;
wherein, the protrusion and depression force adjacent panels together when the panels are joined.

17. The system of claim 16, wherein the upper surface terminates at a distal end, and the tongue comprises a first section extending inwardly of the distal end of the upper surface towards a core situated beneath the upper surface.

18. The building panel of claim 16, wherein the tongue further comprises a second section extending away from a core situated beneath the upper surface and terminating distal of the distal end of the upper surface.

19. A flooring panel
said flooring panel comprising a decorative upper surface;
said flooring panel being defined by edges, at least one of said edges having at least one of a tongue or groove;
said at least one of said tongue or said groove on said panel being sized and shaped so as to engage a corresponding groove or tongue on another similar panel;
at least one of said tongue and groove being provided with a snapping web shaped so as to interfit with a snapping groove on another panel, wherein said snapping groove and said snapping web comprise the same material as said tongue and groove, whereby said panel can be assembled in the absence of glue to form a tight joint;
said groove being formed of the same material as the remainder of the panel and being unitary with the remainder of the panel.

20. The panel of claim 19, further comprising a plurality of paper sheets impregnated with a resin.

21. The panel of claim 19, wherein said panel has at least four edges.

22. The panel of claim 19, wherein the panel is rectangular.

23. The panel according to claim 21, wherein two adjacent edges are provided with a groove and the other two sides are provided with a tongue.

24. The panel according to claim 19, characterized in that one snapping web is formed on an upper side of the tongue and one on a lower side thereof, while the groove has two snapping grooves one at the top and one at the bottom.

25. The panel according to claim 19, wherein an underside of the tongue is situated in the same level as an under side of the panel.

26. The panel according to claim 19, further comprising a forwardly protruding stabilizing part on the tongue.

27. A system of panels comprising a plurality of the panels of claim 19.

28. A floor comprising a plurality of the panels of claim 19, wherein a tongue on said panel is interfitted with a groove on said another panel.

29. The flooring panel of claim 19, further comprising a seal placed in said groove.

30. The floor of claim 28, assembled without glue.

31. The flooring panel of claim 19, wherein a plurality of paper sheets are attached to a carrier.

32. The flooring panel of claim 19, wherein said decorative upper surface comprises at least a decor paper impregnated with a resin.

33. The flooring panel of claim 32, wherein said resin is a melamine resin.

34. The flooring panel of claim 19, wherein said decorative upper surface is one selected from the group consisting of paint, a thermoplastic foil, a paper sheet impregnated with a thermosetting resin, and a thermosetting laminate.

35. The flooring panel of claim 19, wherein said snapping web and snapping groove urge the panels together to form a tight joint.

36. A system for forming a wall, floor or cladding by assembling a plurality of panels into an interlocked unit, said system comprising:
a plurality of panels, each of said panels having sides defining a perimeter;
each of said sides being provided with at least one of a tongue or groove;
said panel having an upper surface formed of a paper impregnated with a thermosetting resin or a thermosetting laminate;
at least one of the tongue and groove being provided with a protrusion;
a complimentary depression cooperating with the protrusion;
wherein, the protrusion and depression force adjacent panels together when the panels are joined, wherein the depression comprises a sloping backside and the protrusion comprises undercut edges, such that when joined, the undercut edges and the backside cooperate with each other.

37. A flooring panel
said flooring panel comprising a decorative upper surface;
said flooring panel being defined by edges, at least one of said edges having at least one of a tongue or groove;
said at least one of said tongue or said groove on said panel being sized and shaped so as to engage a corresponding groove or tongue on another similar panel;
at least one of said tongue and groove being provided with a snapping web shaped so as to interfit with a snapping groove on another panel, wherein said snapping groove and said snapping web comprise the same material as said tongue and groove, whereby said panel can be assembled in the absence of glue to form a tight joint;
said groove being formed of the same material as the remainder of the panel and being unitary with the remainder of the panel, wherein the snapping groove comprises a sloping backside and the snapping web comprises undercut edges, such that when joined, the undercut edges and the backside edges and the backside cooperate with each other.

38. The building panel of claim 1 wherein the thermoplastic comprises a vinyl polymer.

* * * * *